Figure 1:
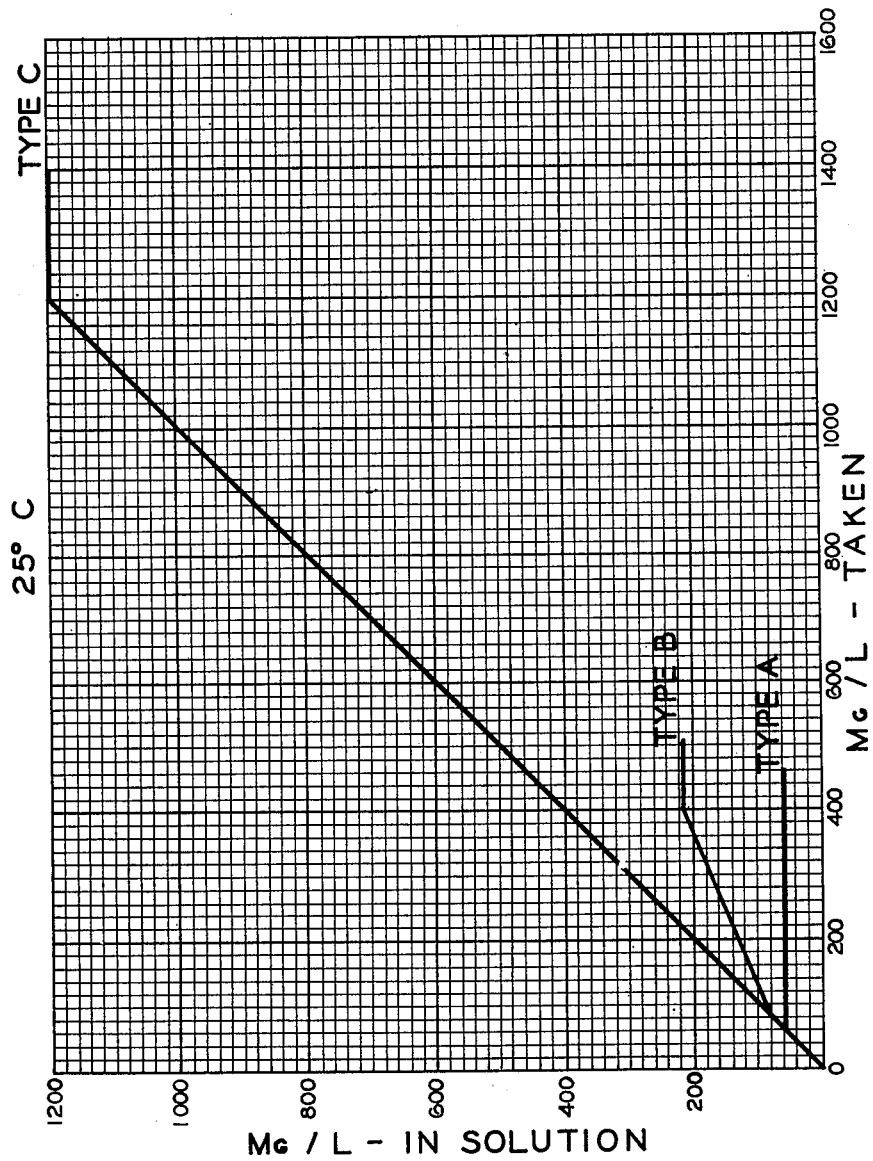

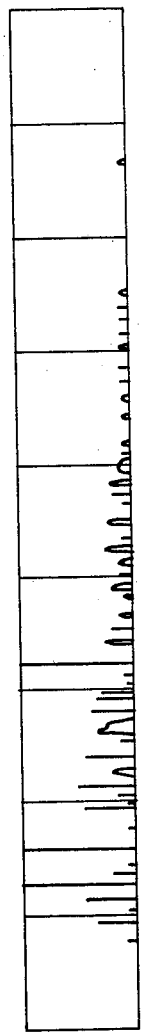
FIGURE 2
TYPE "A"
RIBOFLAVIN
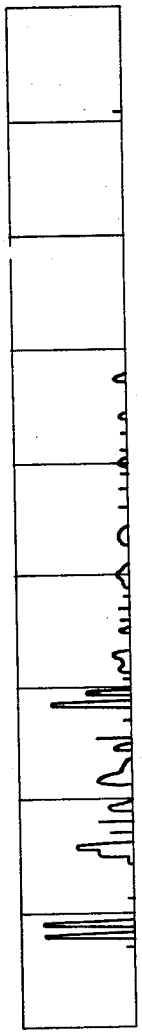
FIGURE 3
TYPE "C"
RIBOFLAVIN
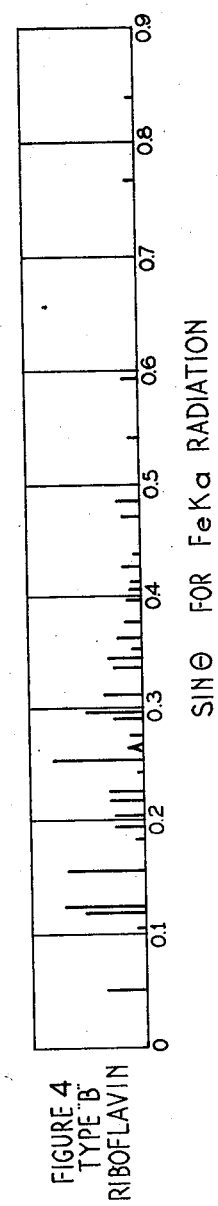
FIGURE 4
TYPE "B"
RIBOFLAVIN
SIN Θ FOR FeKα RADIATION
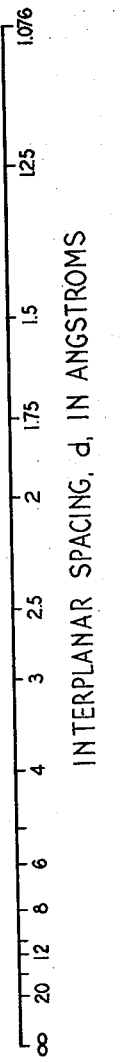
INTERPLANAR SPACING, d, IN ANGSTROMS
GRAPHICAL REPRESENTATION OF X-RAY DIFFRACTION DATA FROM RIBOFLAVIN SAMPLES
INVENTOR
Julian K. Dale
BY Francis M. Crawford
ATTORNEY Patented July 15, 1952

2,603,633

UNITED STATES PATENT OFFICE 2,603,633

CRYSTALLINE FORM OF RIBOFLAVIN

Julian K. Dale, Terre Haute, Ind., assignor to Commercial Solvents Corporation, Terre Haute, Ind., a corporation of Maryland Application January 26, 1950, Serial No. 140,742

7 Claims. (Cl. 260—211.3)

The present invention relates to a new crystalline form of riboflavin and to the method of preparing the same. More particularly, it relates to a new crystalline form of riboflavin which is relatively soluble in water.

Riboflavin, or vitamin $B_2$, a vitamin of the B complex, is a naturally occurring vitamin and its deficiency is recognized as being the most widespread of any of the vitamins. Clinical symptoms of riboflavin deficiency include anorexia, lassitude, keratitis, cheilosis, mydriasis and photophobia. As heretofore known and prepared, riboflavin is only very slightly soluble in water and for that reason its use for hypodermic administration has been long curtailed. Likewise, its use in the pharmaceutical industry has been hampered by its low solubility in solvents ordinarily used in pharmaceutical or food products. Riboflavin is variously reported in the literature to be soluble in water to the extent of from 110 mg. per liter (U. S. Patent No. 2,440,050) to 150–170 mg. per liter (U. S. Patent No. 2,407,624).

The art has therefore long sought for a method of preparing more concentrated solutions of riboflavin which at the same time possess the very important properties of physiological activity and non-toxicity. Various means of producing riboflavin solutions have been tried, but they all possess disadvantages. Solubilizing agents have been used with some success as has been the method of preparing soluble derivatives of riboflavin. In addition, numerous solvents have been proposed in which riboflavin is more soluble than in water. For example, boron compounds, nicotinamide, gallic acid salts, urea, benzoic acid salts, L-tyrosine amide, veratryl alcohol, propylene glycol and vanillin have all been the subjects of numerous patents claiming these compounds as solvents for riboflavin, solubilizing agents or to form soluble reaction complexes with riboflavin.

None of the investigators has, however, succeeded in solving the problem presented by the insolubility of pure riboflavin in water alone. It has not been heretofore possible, therefore, to prepare aqueous solutions of pure riboflavin in concentrations sufficient for hypodermic administration of good therapeutic doses of riboflavin without the necessity of injecting very large volumes of liquid or injection of riboflavin in admixture with or solutions of partially toxic materials.

It has been known that riboflavin may be made to crystallize to give a pure product. During the research work carried out on this investigation, I also discovered that riboflavin crystals of three definite and distinct forms may be prepared, the crystalline form obtained being dependent upon the method and conditions employed for crystallization. For convenience, the three crystalline forms of riboflavin will hereafter in this application be referred to as type A, type B, and type C. Type A is the known crystalline form and is only very slightly soluble in water. Type B has a solubility in water of about 200 mg. per liter provided about twice this amount is added to the water. The present invention is based upon the discovery that riboflavin can be prepared in a new crystalline form, type C, relatively soluble in water at all temperatures, and that this new form of riboflavin can be prepared in a simple, inexpensive and commercially feasible manner. This new form of riboflavin dissolves completely in water to the extent of 1200 mg. per liter at room temperatures.

The new crystalline form of riboflavin comprising my invention differs radically in physical appearance from the other two forms of riboflavin. Whereas type A consists of long, silky hair-like needles and type B consists of short, thin needles in bunches or shelves, my new crystalline form of riboflavin exists as clusters of short wide needles or plates.

Next to physiological activity, the solubility of riboflavin in water is the most important single property and the high solubility of my new type C riboflavin offers a definite means of identification. Figure 1 shows in graphical form the solubility characteristics of the three crystal types of riboflavin. In this graph, there is plotted the mg. per liter of riboflavin dissolved (ordinate) against the quantities of the sample added (abscissa). All solubility measurements were carried out by shaking a weighed amount of the sample with 500 cc. of water containing 0.5% acetic acid for 15 minutes at room temperature.

Referring to the graph of Figure 1, type A riboflavin shows a characteristic solubility curve for a one component, solid phase. The maximum solubility is shown to be about 60 mg. per liter. No further quantity of this form of riboflavin dissolves when increasing amounts are added, the excess simply remaining as undissolved material.

Type B crystals give, to same extent at least, a characteristic solubility curve of a two component solid phase mixture. However, microscopic examination and X-ray diffraction studies show that type B consists of only one type of crystal. The curve plotted from the solubility data obtained with this type of riboflavin forms a 45° angle with the abscissa and ordinate up to the point of complete solubility, then as further quantities are added additional amounts go into solution but to a decreasing extent until a saturated solution is reached, after which the curve levels off. The maximum complete solubility of type B is shown to be 80 mg. per liter, but a solution of more than 200 mg. per liter can be obtained by adding as much as 400 mg. per liter, leaving about 200 mg. per liter undissolved.

As shown by the graph of Figure 1, type C riboflavin crystals are much more highly soluble than either type A or B. Likewise type A, the solubility curve shows that type C is a pure chemical individual, but whereas type A is completely soluble only to the extent of 60 mg. per liter this new type of riboflavin will dissolve completely to the extent of 1200 mg. per liter; that is, it is 20 times as soluble as type A. Compared with type B it is 15 times as soluble for complete solubility and a saturated solution is 6 times as concentrated as the maximum concentration that can be obtained with type B.

My new type C crystalline form of riboflavin is also much more soluble in alcohols than are types A and B. In table I, below, are shown the results of solubility tests at 25° C. with the three different crystalline forms of riboflavin.

TABLE I

| Crystalline Form | Solvent | Solubility (mg./l) |
|---|---|---|
| A | Ethyl alcohol | 20 |
| B | do | 45 |
| C | do | 660 |
| A | Methyl alcohol | 35 |
| B | do | 180 |
| C | do | 540 |

Since the physiological activity of riboflavin is the really important property, type C riboflavin has been submitted to rat feeding tests. The procedure employed for these tests was the accepted method developed by Paul L. Day and William J. Darby, and described in the article entitled "The Bioassay of Riboflavin" appearing in Biological Symposia, volume XII, The Jacques Cattell Press, 1947. According to the method therein described 5.0 micrograms of the sample to be assayed is fed to rats daily for varying numbers of days. The weights of the rats are recorded before and after the tests. Identical tests are made using a standard sample of riboflavin of known physiological activity. To evaluate the activity of the tested sample, the weight increases of the rats fed the test sample are compared with the weight increases of the rats fed the standard sample. The results of the test with type C riboflavin, tabulated in Table II below, show that the biological activity of this new crystalline form of riboflavin is equal to or slightly higher than that of the U. S. P. Reference Standard used.

TABLE II

| Rat No. | Beginning of Depletion Period | | Depletion Period | Daily Dose of Supplement | Duration of Assay | Body Weight During Assay Period (Gms) | | |
|---|---|---|---|---|---|---|---|---|
| | Age | Weight | | | | Initial | Final | Change |

(SUPPLEMENT: U. S. P. RIBOFLAVIN REFERENCE STANDARD)

| | days | gms. | days | micrograms | days | | | |
|---|---|---|---|---|---|---|---|---|
| 1 | 23 | 45 | 29 | 5 | 28 | 79 | 152 | 73 |
| 2 | 23 | 44 | 30 | 5 | 28 | 73 | 144 | 71 |
| 3 | 23 | 45 | 32 | 5 | 28 | 70 | 124 | 54 |
| 4 | 23 | 44 | 32 | 5 | 28 | 80 | 128 | 48 |
| 5 | 23 | 45 | 32 | 5 | 28 | 107 | 158 | 57 |
| 6 | 23 | 44 | 33 | 5 | 28 | 83 | 129 | 46 |
| 7 | 23 | 45 | 33 | 5 | 28 | 78 | 130 | 52 |
| 8 | 23 | 44 | 34 | 5 | 28 | 104 | 188 | 84 |
| 9 | 23 | 46 | 37 | 5 | 28 | 114 | 172 | 58 |
| 10 | 23 | 44 | 40 | 5 | 28 | 106 | 149 | 43 |
| Average | | | | | | 89.4 | 147.4 | 57.0 |

(SUPPLEMENT: TYPE C RIBOFLAVIN)

| 11 | 23 | 45 | 29 | 5 | 28 | 83 | 138 | 55 |
|---|---|---|---|---|---|---|---|---|
| 12 | 23 | 44 | 30 | 5 | 28 | 73 | 157 | 84 |
| 13 | 23 | 45 | 32 | 5 | 28 | 90 | 150 | 60 |
| 14 | 23 | 44 | 32 | 5 | 28 | 88 | 142 | 54 |
| 15 | 23 | 45 | 32 | 5 | 28 | 98 | 150 | 52 |
| 16 | 23 | 44 | 33 | 5 | 28 | 110 | 178 | 68 |
| 17 | 23 | 45 | 33 | 5 | 28 | 76 | 145 | 69 |
| 18 | 23 | 44 | 36 | 5 | 28 | 89 | 139 | 50 |
| 19 | 23 | 46 | 36 | 5 | 28 | 97 | 166 | 69 |
| 20 | 23 | 43 | 40 | 5 | 28 | 105 | 169 | 64 |
| Average | | | | | | 90.9 | 153.4 | 62.5 |

The U. S. Pharmacopoeia specification for riboflavin has required that the sample give a negative test for lumiflavin. The test prescribed is that when 25 mg. of riboflavin is shaken for 5 minutes with 10 cc. of chloroform and filtered, the filtrate should have no more color than 3 cc. of 0.1 N $K_2Cr_2O_7$ diluted to 1 liter. The basis for this test is that lumiflavin is soluble in chloroform, thus imparting a color when dissolved, whereas riboflavin is insoluble in chloroform. Type C riboflavin gives a positive test for lumiflavin when tested in chloroform as ordinarily sold on the market. Such chloroform contains about 1% alcohol, added as a preservative. The reason for the apparent positive test is that type C riboflavin is so much more soluble than the other forms of riboflavin that sufficient of this riboflavin itself dissolves in the chloroform (containing alcohol) to impart a color to the solution. Thus, when the alcohol is removed by washing the chloroform with water and drying out the water, a negative lumiflavin test is obtained. In alcohol-free chloroform, therefore, type C riboflavin shows no signs of the presence of lumiflavin.

As a further confirmation of the conclusion that the apparent positive lumiflavin test obtained when using ordinary commercial chloroform, containing alcohol, is due to the actual solution of a small amount of the highly soluble riboflavin itself, the following experiment was carried out: An authentic sample of type C riboflavin was shaken with chloroform to remove any possible traces of lumiflavin. The crystals were filtered and dried. This sample gave a negative test for lumiflavin with alcohol-free chloroform, but still gave a positive test with the ordinary chloroform-containing alcohol.

As is known, X-ray diffraction methods are capable of positively identifying crystalline phases. The diffraction angle, between the X-rays incident upon the specimen, and the set of planes of interplanar spacing, $d$, is given by the well known Bragg relation $$d = \frac{\lambda}{2 \sin \theta}$$

where $\lambda$ is the wave length of the X-radiation. $\lambda$ and $d$ are generally expressed in Ångstrom units ($1\text{Å} = 10^{-8}$ cm.). Thus, if $\theta$ is measured and $\lambda$ is known, $d$ can be readily computed.

For polycrystalline materials such as riboflavin, the spacings can be obtained by exposing a small amount of sample in a narrow beam of monochromatic X-rays of known wave length. The X-ray reflections from the planes of various spacings, $d$, strike a photographic film placed as a concentric cylinder around the sample. The various angles, $\theta$, and the corresponding $d$'s, are computed from the photographic record using Bragg relation. The set of spacing values, $d$, is unique for each crystalline phase, and these data, together with a measurement of the relative intensities of the X-ray reflections from each set of planes provides a characteristic "fingerprint" or identification of the phase.

In Figures 2, 3 and 4, and Tables III, IV and V, the X-ray diffraction data obtained with samples of type A, type B and type C riboflavin are shown in graphical and tabular form. In the graphs, the relative intensity visually estimated is plotted as ordinate, and the sine of the Bragg angle, $\theta$, or angle of diffraction, is plotted as the abscissa. As an alternate abcissa scale, the interplanar spacings, $d$, are also marked below the $\theta$ scale. For any given sample, the value of the sine $\theta$ computed from the photogram for the series of reflections refer to the particular radiation used. Iron radiation ($\lambda = 1.9373$ Å.) was used in this work. The basic values, $d$, computed from the Bragg equation, are representative of the sample independently of the X-radiation employed, and are generally preferred when the data are given in tabular form.

In Figures 2, 3 and 4, the intensity of a reflection is plotted as a vertical line of given height if the breadth of the reflection as seen on the film corresponds to the minimum line breadth characteristic of the camera. In some instances, however, the reflection is broader than the maximum width, and in these cases, a peak of finite width is plotted instead of a vertical line. In the photograms, line broadening may result from the following factors: (1) Several reflections may occur too close together to be resolved as individual sharp reflections, or (2) the crystalline structure of the sample is imperfect in some directions, so that a range of interplanar spacings is indicated rather than a single finite spacing.

In Tables III, IV and V, the interplanar spacings ($d$ values) are given with the corresponding spacing intensitites.

TABLE III

*Type A riboflavin crystals*

| Spacing (Ångstroms) | Intensity | Spacing (Ångstroms) | Intensity |
|---|---|---|---|
| 12.1 | Very faint. | 2.48 | Very faint+. |
| 10.2 | Medium faint+. | 2.46 | Very, very faint+. |
| 9.2 | Very, very faint. | 2.40 | Do. |
| 8.5 | Medium+. | 2.33 | Very faint, diffuse. |
| 7.6 | Very strong. | 2.28 | Faint+, diffuse. |
| 7.1 | Faint. | 2.22 | Very, very faint. |
| 6.67 | Very, very faint. | 2.15 | Faint, diffuse. |
| 6.12 | Very strong+. | 2.08 | Very, very faint. |
| 5.55 | Very, very faint. | 2.05 | Very faint+. |
| 5.03 | Medium+. | 2.00 | Very faint+, diffuse. |
| 4.86 | Very, very faint, diffuse. | 1.96 | Very faint. |
| | | 1.917 | Band. |
| 4.72 | Very faint+. | 1.89 | Very, very faint. |
| 4.53 | Medium strong. | 1.86 | Very, very faint, diffuse. |
| 4.27 | Faint, diffuse. | | |
| 4.02 | Medium+. | 1.83 | Do. |
| 3.82 | Very faint. | 1.723 | Very faint, very diffuse. |
| 3.65 | Medium faint. | | |
| 3.58 | Faint+. | 1.678 | Very, very faint.+ |
| 3.46 | Medium. | 1.643 | Do. |
| 3.30 | Medium faint+. | 1.600 | Very, very faint diffuse. |
| 3.22 | Medium faint. | | |
| 3.14 | Very, very faint. | 1.566 | Very, very faint. |
| 3.05 | Very, very faint+. | 1.539 | Do. |
| 2.96 | Very strong+. | 1.509 | Do. |
| 2.81 | Faint+, diffuse. | 1.483 | Very, very faint. diffuse. |
| 2.72 | Faint. | | |
| 2.64 | Very faint, diffuse. | 1.260 | Do. |
| 2.53 | Very, very faint, diffuse. | | |

TABLE IV

*Type B riboflavin crystals*

| Spacing (Ångstroms) | Intensity | Spacing (Ångstroms) | Intensity |
|---|---|---|---|
| 18.8 | Medium faint+. | 2.88 | Faint+. |
| 9.28 | Very, very faint. | 2.81 | Medium faint. |
| 8.25 | Medium strong. | 2.75 | Very, very faint+. |
| 7.90 | Strong+. | 2.67 | Faint. |
| 6.22 | Do. | 2.57 | Very faint+. |
| 5.28 | Very, very faint+. | 2.44 | Do. |
| 5.01 | Faint+. | 2.38 | Very faint. |
| 4.77 | Do. | 2.34 | Do. |
| 4.45 | Medium faint. | 2.27 | Very faint+. |
| 4.30 | Do. | 2.21 | Very, very faint. |
| 3.99 | Very, very faint. | 2.06 | Very faint+. |
| 3.83 | Very strong. | 2.00 | Faint. |
| 3.66 | Very faint+, diffuse. | 1.80 | Very faint. |
| 3.49 | Very faint+. | 1.635 | Very faint+. |
| 3.33 | Faint+. | 1.251 | Very, very faint+. |
| 3.26 | Medium strong. | 1.153 | Very, very faint. |
| 3.10 | Medium faint+. | | |

TABLE V

*Type C riboflavin crystals*

| Spacing (Ångstroms) | Intensity | Spacing (Ångstroms) | Intensity |
|---|---|---|---|
| 12.2 | Very strong. | 2.96 | Very faint+, diffuse. |
| 10.8 | Do. | 2.76 | Very faint. |
| 8.50 | Very, very faint. | 2.68 | Very, very faint. |
| 6.59 | Very, very faint, diffuse. | 2.61 | Very, very faint+. |
| | | 2.54 | Very, very faint. |
| 6.33 | Medium faint, diffuse | 2.46 | Very, very faint, diffuse. |
| 6.09 | Medium strong. | 2.42 | Very faint+, diffuse. |
| 5.72 | Faint. | 2.24 | Very, very faint+, very diffuse. |
| 5.38 | Medium faint. | | |
| 5.02 | Faint, diffuse. | 2.11 | Very, very faint.+ |
| 4.46 | Faint+, diffuse. | 2.03 | Very, very faint. |
| 4.32 | Very, very faint+. | 1.977 | Do. |
| 3.93 | Very faint+, diffuse. | 1.944 | Very, very faint+. |
| 3.79 | Medium faint. | 1.895 | Very, very faint. |
| 3.58 | Very, very faint+. | 1.846 | Do. |
| 3.38 | Strong+. | 1.795 | Very, very faint, diffuse. |
| 3.26 | Medium. | | |
| 3.13 | Very, very faint. | 1.690 | Very faint, diffuse. |
| 3.05 | Very, very faint, diffuse. | 1.197 | Very, very faint+. |

The complete identification of a crystalline phase normally depends upon matching the entire pattern with that of the standard to identify alternate forms of riboflavin; however, if it is assumed that the sample is free from phases other than the various forms of riboflavin, and that the X-ray pattern has been carefully prepared to avoid intensity variations due to preferred orientation, it is possible to make comparisons of lines with respect to intensity ratios. With mixtures of these phases, and consequent overlapping of many lines, it is necessary to consider possible enhancement of the intensities, and in practice the intensity ratios of several pairs of lines should be compared.

Thus, the most characteristic X-ray diffraction properties of type A are strong reflections with For further identification, samples of the various forms of riboflavin were studied under the polarizing microscope. Provided the size of the crystals is sufficiently large to enable the microscopist to make the necessary observations, it is generally possible to distinguish and identify phases from their optical activity. For riboflavin of types A and C sufficient data were obtained to distinguish these types in a routine manner. Type B, however, crystallizes only in the form of exceedingly small crystals from which optical data are unobtainable. The size and appearance of type B crystals provides a partial identification, by elimination.

In Table VI, below, are given the results of polarizing microscope examinations of riboflavin types A and C.

TABLE VI

|  | Type A | Type C |
| --- | --- | --- |
| Form and Habit of Crystals | Long Needles With Very Small Cross Section—No Twinning. | Lathlike Crystals—Cleavage Good—Twinning is Common. |
| Refractive Index for light with electric vector vibrating parallel to long axis. | >1.74 | <1.538. |
| Refractive Index for light vibrating perpendicular to long axis. | 1.65–1.74 | >1.74. |
| Sign of Elongation | Positive | Negative. |
| Extinction | Parallel | Varies from about 33° to 0° as measured from the long edge of crystal. |
| Pleochroism | None | Strong—(crystals yellow for light vibrating nearly parallel to long axis of the crystal and orange for light vibrating nearly perpendicular to the long axis of the crystal). | interplanar spacings of about 7.6, 6.1 and 2.96 Å., all nearly equal in intensity. Type B is characterized by a strong broad peak or a double peak about 8.0 to 8.2 Å. and strong peaks at 6.2 and 3.83 Å., a quadruplet of medium-strength reflections nearly equal in intensity and almost equally spaced at 5.0, 4.8, 4.5 and 4.3 Å., respectively, and a reflection of very high interplanar spacing about 19 Å. with moderate intensity.

Type C is characterized by a pair of strong reflections nearly equal in intensity at about 12.2 and 10.8 Å., respectively, a group of unresolved reflections of medium intensities centered about 6.1 Å., and a pair of reflections at 3.38 and 3.26 Å., the 3.38 Å. reflection being about twice as strong as the 3.26 Å.

In a mixture of types A and B, the strong peaks at 8 and 7.6 Å., respectively, would both appear, but would not be completely resolved. The intensities of the 6.1 and 6.2 Å. peaks would enhance each other. The relative intensity of the quadruplet of type B would be disturbed. The reflections at 10.2 and 2.96 Å. would be used to detect type A. The reflections at 19 and 3.83 Å. would be used to detect type B.

In a mixture of types A and C, the reflections at 7.6 and 2.96 Å. would be used to detect type A, while the reflections of the pair at 12.2 and 10.8 Å. would be used to detect type C.

In a mixture of types B and C, the reflections at 19, 8, and 3.83 Å. would be used to detect type B, and the pair at 12.2 and at 10.8 Å. would be used to detect type C.

It can therefore be seen that in a sample which is known to contain riboflavin, the presence of the relatively soluble type C riboflavin can be easily determined by the characteristic pair of strong reflections nearly equal in intensity at about 12.2 and 10.8 Å., respectively.

The new crystalline form of riboflavin which comprises my invention can be prepared by dissolving crude riboflavin in aqueous alkaline solution to give a riboflavin concentration of between 10 and 30 grams per liter. The solution is filtered and acidified with an acid, and riboflavin immediately crystallizes in the form of bunches or rosettes of well defined, plate-like needles. The crystals are then filtered, washed and dried in a vacuum oven.

The purity of the crude riboflavin is not the factor which determines the crystalline form obtained in the crystallization step. I have found that riboflavin of any purity can be used, provided sufficient quantities are added to give an alkaline solution containing between 10 and 30 grams of riboflavin per liter, at room temperatures. However, a reasonably pure crude product should be employed as the starting material so as to prevent crystallization of a final product containing large amounts of impurities. I have found that crude riboflavin of from 80 to 100% purity gives a final product of very high purity.

Any aqueous alkaline solution which will dissolve from 10 to 30 grams per liter of riboflavin at room temperatures can be used. The alkali metal hydroxides are particularly adaptable for this step since very dilute solutions of the hydroxides readily dissolve sufficient quantities of riboflavin. Excellent results are also obtained when aqueous solutions of ammonium hydroxide are used to dissolve the riboflavin. In addition, aqueous solutions of any amine which will dissolve sufficient riboflavin to give a concentration within the range of 10–30 grams per liter can be used. The aliphatic amines are particularly useful for this purpose.

The aqueous alkaline solution must be of sufficient strength to dissolve between about 10–30 grams of riboflavin per liter. The normality of the alkaline solution should be kept as low as possible, but still dissolve sufficient quantities of riboflavin.

While the concentration of riboflavin in the aqueous alkaline solution must be between 10 and 30 grams per liter to produce type C crystals at room temperatures, (20° to 25° C.), considerably lesser concentrations may be employed if the solution is cooled to about 10° C. before the acidification. Thus, if the solution is cooled before acidifying, the concentration of riboflavin in the aqueous alkaline solution can be as low as 2 to 3 grams per liter. At room temperatures, however, the concentration of 10–30 grams per liter is critical.

After the riboflavin has been dissolved in the aqueous alkaline solution, it is desirable to filter the solution so as to separate any non-soluble impurities present in the starting crude riboflavin.

After filtration, acid is added to the aqueous alkaline solution containing riboflavin in quantities sufficient to reduce the pH below about 9.0, and preferably below about 6.0. Any acid may be used for this step, particularly good results being obtained with sulfuric, nitric, hydrochloric, phosphoric, and acetic acids. When the pH of the solution reaches below about 9.0 crystals of our new type C riboflavin immediately separate. The crystals are then filtered, washed and dried.

It is necessary that the crystals be washed to remove excessive amounts of salts which are found in the wet cake following filtration. My new type crystal is a highly metastable form of riboflavin and has a tendency to revert to a crystalline form of lower solubility during the washing step. This reversion tendency is not apparent during the crystallization and filtration steps.

I have found that the crystals can be washed with tertiary butyl alcohol without any reversion of the crystalline form taking place. Other organic solvents which we have tried for the washing treatment have all caused considerable quantities of the crystals to revert to a form of lower solubility. Water can also be used to wash the crystals, but without the high degree of success experienced with tertiary butyl alcohol. The crystals can be consistently washed with water, without reversion taking place, provided the temperature is maintained below about 10° C. With tertiary butyl alcohol, however, refrigeration is not necessary. Washing the filter cake with tertiary butyl alcohol at room temperatures has in every instance given a low ash product completely free from any signs of a lower soluble form of riboflavin.

For a more complete understanding of the method of preparation of my new crystalline form of riboflavin, reference will now be made to certain specific examples. It will be understood, however, that this invention is not to be restricted in any way by these specific examples since they are merely illustrative and are not definitive of the broad aspects of the present invention.

EXAMPLE I

Seventy-nine grams of crude riboflavin, 95% pure, was dissolved in 2500 ml. of 0.1 N sodium hydroxide. The solution was filtered with addition of a filter aid and the filter cake washed with water. The filtrate and wash were diluted to 15,780 ml. with water, thus giving a concentration of 4.7 grams of riboflavin per liter. This alkaline solution was cooled to 10° C. and acidified with 2 N sulfuric acid to pH 4.0. Crystallization started quickly. The crystallizing solution was held at approximately 10° C. over night. The crystals were then removed on a suction funnel, washed with a little cold water and dried in a vacuum oven at 70° C. The dried material assayed 100% riboflavin, was essentially free from ash and dissolved completely in water at a level of 1200 mg. per liter.

EXAMPLE II

One hundred and fifty grams of crude riboflavin, 95% pure, was dissolved in 4800 ml. of 0.1 N sodium hydroxide at 25° C. The solution was filtered with the addition of a filter aid and the filter cake washed with water. The filtrate and wash combined were diluted to 6000 ml., thus giving a solution of 23.8 grams of riboflavin per liter in 0.08 N sodium hydroxide solution. This solution was acidified slowly with 2 N sulfuric acid, crystallization starting as the pH reached about 8.0. The acidification was continued to a pH of 4.0. After fifteen minutes the crystals were separated by filtration on a suction funnel and washed with tertiary butyl alcohol until the washings were free from the sulfate ion. The filter cake was dried in a vacuum oven at 70° C. The resulting product assayed 100% riboflavin, was essentially free from ash and dissolved completely at a level of 1200 mg. per liter.

EXAMPLE III

In this example the procedure outlined in Example II was followed exactly, except that the riboflavin crystals were washed with water at a temperature of about 10° C. In this example the resulting product assayed 100% riboflavin and dissolved completely at a level of 1200 mg. per liter.

While some particular embodiments of this invention are shown above, it will be understood, of course, that the invention is not to be limited thereto, since any modification may be made, and it is contemplated, therefore, by the appended claims, to cover any such modifications as fall within the true spirited scope of this invention.

I claim:

1. A new crystalline form of riboflavin, as described, characterized by the following properties: (a) refractive index parallel to the elongation of crystals of less than about 1.538 and perpendicular to elongation of above 1.74, (b) negative sign of elongation, (c) extinction—varying from about 33° to 0° as measured from long edge of crystals, (d) strong pleochroism, (e) common twinning of crystals, (f) solubility in water of about 1200 mg. per liter at 25° C., (g) X-ray diffraction properties characterized by a pair of strong reflections nearly equal in intensity at about 12.2 and 10.8 Å., respectively, a group of unresolved reflections of medium intensities centered about 6.1 Å. and a pair of reflections at 3.38 and 3.26 Å., the 3.38 Å. reflection being about twice as strong as the 3.26 Å.

2. The process for preparing a new crystalline form of riboflavin which comprises, dissolving from 10–30 grams of riboflavin per liter in an aqueous alkaline solution, adding acid to said solution, separating the crystals of riboflavin which form, washing said crystals with a member selected from the group consisting of water at a temperature below about 10° C. and tertiary butyl alcohol, and drying said riboflavin crystals.

3. The process for preparing a new crystalline form of riboflavin which comprises dissolving riboflavin in an aqueous alkaline solution selected from the group consisting of alkali metal and ammonium hydroxides, 10-30 grams of riboflavin being dissolved per liter of alkaline solution, reducing the pH of said solution below about 9.0 with an acid selected from the group consisting of sulfuric, nitric, hydrochloric, phosphoric, and acetic acids, separating the crystals of riboflavin which form, washing said crystals with a member selected from the group consisting of water at a temperature below about 10° C. and tertiary butyl alcohol, and drying said riboflavin crystals.

4. A process for preparing riboflavin crystals of relatively high water solubility which comprises, dissolving from 10-30 grams per liter of riboflavin in an aqueous alkaline solution selected from the group consisting of alkali metal and ammonium hydroxide, filtering said solution, reducing the pH to below about 9.0 with an acid selected from the group consisting of sulfuric, nitric, hydrochloric, phosphoric, and acetic acids, separating the riboflavin crystals which form, washing the said crystals with tertiary butyl alcohol and drying the relatively soluble riboflavin crystals.

5. A process for preparing riboflavin crystals of relatively high water solubility which comprises, dissolving 10-30 grams per liter of riboflavin in an aqueous alkaline solution selected from the group consisting of alkali metal and ammonium hydroxides, filtering said solution, reducing the pH below about 9.0 with an acid selected from the group consisting of sulfuric, nitric, hydrochloric, phosphoric, and acetic acids, separating the riboflavin crystals which form, washing said crystals with water at a temperature below about 10° C. and drying the relatively soluble riboflavin crystals.

6. A process for preparing riboflavin crystals of relatively high water solubility which comprises, dissolving about 25 grams per liter of riboflavin in an aqueous alkaline solution selected from the group consisting of alkali metal and ammonium hydroxides, filtering said solution, acidifying to a pH below about 6.0 with an acid selected from the group consisting of sulfuric, nitric, hydrochloric, phosphoric, and acetic acids, separating the riboflavin crystals which form, washing the said crystals with tertiary butyl alcohol and drying the relatively soluble riboflavin crystals.

7. A process for preparing riboflavin crystals of relatively high water solubility which comprises, dissolving riboflavin in an aqueous sodium hydroxide solution, about 25 grams of riboflavin being dissolved per liter of sodium hydroxide solution, acidifying said solution to a pH below about 6.0 with sulfuric acid, separating the crystals of riboflavin which form, washing said crystals with tertiary butyl alcohol, and drying said relatively soluble riboflavin crystals.

JULIAN K. DALE.

REFERENCES CITED

The following references are of record in the file of this patent:

UNITED STATES PATENTS

| Number | Name | Date |
| --- | --- | --- |
| 2,374,661 | Bergel et al. | May 1, 1945 |
| 2,421,142 | Dale | May 27, 1947 |